Aug. 7, 1951      H. L. PETERSON      2,563,063

ADJUSTABLE RING GAUGE

Filed Jan. 22, 1947

INVENTOR.
Harold L. Peterson.
BY
Chas. T. Hawley ATTY.

Patented Aug. 7, 1951

2,563,063

UNITED STATES PATENT OFFICE 2,563,063

ADJUSTABLE RING GAUGE

Harold L. Peterson, Worcester, Mass., assignor to John Bath & Company, Worcester, Mass., a corporation of Massachusetts Application January 22, 1947, Serial No. 723,604

1 Claim. (Cl. 33—178)

This invention relates to ring gauges and to means for closely adjusting the internal diameter of such gauges. While capable of general application, the invention relates more particularly to ring gauges which are internally threaded and which are to be used to measure screw threads.

It is the general object of my invention to provide improved means for slightly adjusting or varying the internal diameter of such a ring gauge and for securely retaining the adjusted setting.

A further object is to provide an adjustable ring gauge which comprises very few parts and in which the parts are comparatively simple and are relatively inexpensive to manufacture.

My invention further relates to arrangements and combinations of parts which will be hereinafter described and more particularly pointed out in the appended claim.

A preferred form of the invention is shown in the drawings, in which

Figure 1:
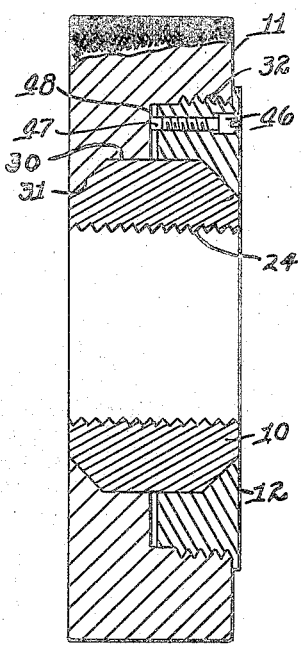
Fig. 1 is an enlarged sectional elevation of my improved gauge.

Referring to the drawings, my improved adjustable ring gauge comprises an inner ring or gauge member 10, an outer holder 11, and a clamping member 12.

The inner ring 10 has a cylindrical outer surface 20 and beveled or frusto-conical end surfaces 21 and 22, and is slotted at 23 to permit slight expansion or contraction thereof.

Figure 2:
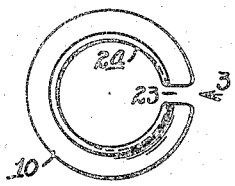
Fig. 2 is an end view of the inner or gauging member.
Figure 3:
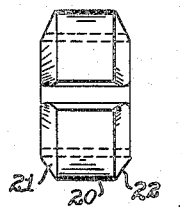
Fig. 3 is a side elevation thereof, looking in the direction of the arrow 3 in Fig. 2.
Figure 4:
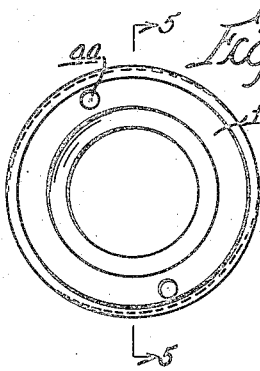
Fig. 4 is an end view of a clamping ring.
Figure 5:
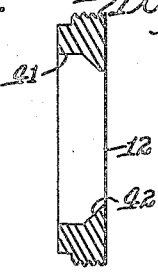
Fig. 5 is a sectional elevation thereof, taken along the line 5—5 in Fig. 4.
Figure 6:
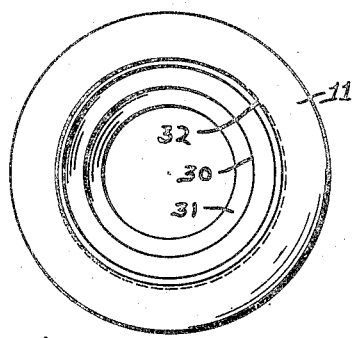
Fig. 6 is an end view of the outer member or holder.
Figure 8:
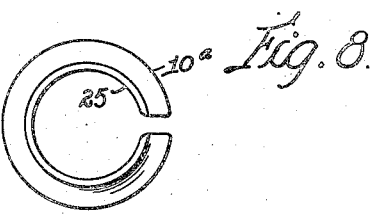
Fig. 8 is a view similar to Fig. 2 but showing a slight modification.

The inner surface 24 may be threaded as shown in Fig. 2, if the device is to be used as a thread gauge, or may have a cylindrical opening 25 in a gauge member 10a (Fig. 8), if the device is to be used as a plain ring gauge. The inner member 10 or 10a is so constructed that when in normal or free condition, the internal diameter of the member will be slightly oversize or larger than the actual diameter for which the gauge is to be used.

Figure 7:
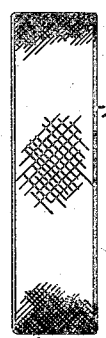
Fig. 7 is a side elevation thereof.

The outer member or holder 11 has a cylindrical recess 30 to receive the gauge member 10 and has an inwardly projecting beveled surface 31 which is engaged by the beveled or conical end surface 21 of the member 10. The holder 11 preferably has a knurled outer surface for convenience in handling, as shown in Fig. 7, and is provided with an enlarged and internally threaded recess 32 adapted to receive the clamping ring 12.

The clamping ring 12 is externally threaded at 40 to fit the threaded recess 32 in the holder 11, and is provided with an internal cylindrical surface 41, preferably of the same diameter as the recess 30 in the holder 11. The ring 12 also has an inwardly projecting beveled or conical surface 42 adapted to engage the end surface 22 of the inner or gauge member 10.

The clamping ring 12 is preferably provided with holes 44 to receive the studs of a suitable spanner for turning the ring 12 in adjusting the gauge.

My improved ring gauge is easily assembled by placing the member 10 in the recess 30 of the holder 11 and then applying axial pressure to the member 10 by inserting and turning the clamping ring 12. This operation applies endwise pressure to the conical surfaces 21 and 22 of the gauge member 10. As the gauge member 10 is split at 23, such endwise pressure naturally contracts the gauge member until the desired internal diameter is attained. A clamping screw 46 (Fig. 1) may then be tightened to force a loose plug 47 against the surface 48 of the holder 11, thus preventing any possible displacement of the clamping ring 12.

I have thus provided a very simple adjustable ring gauge comprising only a split gauge member 10, a holder 11 and a clamping ring 12, all of which parts are of simple construction and may be easily manufactured. Furthermore, the contracting pressure is uniformly applied at both ends of the inner member 10 and at all points about the periphery of said member, so that uniform contraction is obtained and so that the gauging surface remains an accurate surface of revolution.

Having thus described my invention and the advantages thereof, I do not wish to be limited to the details herein disclosed, otherwise than as set forth in the claim, but what I claim is:

An adjustable ring gauge comprising a rigid holder having a cylindrical recess with an inwardly projecting frusto-conical flange at one end and with an enlarged and internally threaded recess at the other end, a cylindrical slotted resilient inner gauge member which is normally oversize and which is insertable in said cylindrical recess and which has two frusto-conical end surfaces, one of said surfaces having substantial surface-engagement with the corresponding surface of said frusto-conical holder flange, a clamping member threaded in said enlarged recess of said holder and having a frusto-conical clamping surface having substantial surface-engagement with the second frusto-conical end surface of said inner gauge member, and means to retain said holder and said member in selected angular relation, the coacting frusto-conical surfaces of said holder, said gauge member and said clamping member reacting to contract said gauge member uniformly to a selected diameter by rotation of said clamping member in said holder in a direction to cause the frusto-conical surfaces of said holder and clamping member to approach each other and to thereby exert contracting pressure on said gauge member.

HAROLD L. PETERSON.

REFERENCES CITED

The following references are of record in the file of this patent:

UNITED STATES PATENTS

| Number | Name | Date |
| --- | --- | --- |
| 473,582 | Keiper | Apr. 26, 1892 |
| 664,995 | Ernst | Jan. 1, 1901 |
| 1,282,392 | Doonaevski | Oct. 22, 1918 |
| 1,487,803 | Peterson | Mar. 25, 1924 |
| 1,843,202 | Buchanan | Feb. 2, 1932 |
| 2,000,783 | Muller | May 7, 1935 |

FOREIGN PATENTS

| Number | Country | Date |
| --- | --- | --- |
| 353,674 | Germany | May 23, 1922 |
| 850,824 | France | Sept. 18, 1939 |